United States Patent [19]

Koch, II

[11] 4,113,894

[45] Sep. 12, 1978

[54] RADIATION CURABLE COATING PROCESS

[75] Inventor: Robert L. Koch, II, Evansville, Ind.

[73] Assignee: George Koch Sons, Inc., Evansville, Ind.

[21] Appl. No.: 731,755

[22] Filed: Oct. 12, 1976

[51] Int. Cl.[2] .......................... B01J 1/10; B32B 31/28

[52] U.S. Cl. ...................................... 427/44; 156/231; 156/247; 156/249; 156/272; 156/330; 156/332; 204/159.11; 204/159.19; 264/22; 427/54; 427/362

[58] Field of Search ........................... 427/44, 54, 362; 204/159.19, 159.11; 156/231, 247, 249, 272, 330, 332; 264/22

[56] References Cited

U.S. PATENT DOCUMENTS

| | | | |
|---|---|---|---|
| 3,511,687 | 5/1970 | Keyl et al. | 427/54 |
| 3,669,716 | 6/1972 | Keyl et al. | 427/54 |
| 3,713,935 | 1/1973 | Grecchi | 156/231 |
| 3,810,816 | 5/1974 | Zachariades | 427/44 X |
| 3,935,364 | 1/1976 | Proksch et al. | 427/44 X |

*Primary Examiner*—Michael R. Lusignan
*Attorney, Agent, or Firm*—Jenkins, Coffey & Hyland

[57] ABSTRACT

A curable coating process wherein the surface of a panel formed from wood, particle board, plastic, etc., is coated with a radiation curable coating. A radiation permeable film has a controlled gloss surface on one side thereof, and the film is placed over the panel with the controlled gloss surface in intimate contact with the uncured radiation sensitive coating. The panel and film are then together irradiated to cure the coating to the same gloss as the gloss controlled surface, with the sheet and film being removed after curing.

10 Claims, 4 Drawing Figures

RADIATION CURABLE COATING PROCESS

BACKGROUND OF THE INVENTION

This invention related to a process for coating surfaces of various materials with a radiation curable coating. More specifically, this invention relates to a process for applying a radiation curable coating to a panel surface wherein the coating is cured to a predetermined surface gloss.

In the furniture and wood finishing industry, it is highly desirable for natural and simulated wood surfaces to have the appearance of a natural hand-rubbed finish. Such a hand-rubbed finish is normally achieved with a plurality of sprayed lacquer coatings, and the last coating is hand-rubbed to the desired surface gloss. This surface Gloss is quantitatively measurable with equipment such as a 60° glossometer, with a surface finish of approximately 60 gloss being presently popular with furniture. However, hand-rubbed lacquer finishes have not been totally satisfactory in that the hand-rubbing is a relatively costly step which substantially increases the cost of the furniture. Further, while lacquer coatings are relatively easy to hand rub, they are also highly susceptible to dámage from scratches, cigarette burns, water marks, etc. Accordingly, it is desirable to simulate esthetically popular lacquer finishes on natural and simulated wood surfaces with a more durable finish which does not require any expensive hand rubbing.

In the prior art, laminated plastic materials such as those sold under the trademark Formica have been widely used to simulate natural wood surfaces. Such laminated plastics typically have a wood grain design printed thereon, and are retained on furniture or other substrates by an adhesive. Laminated plastics are advantageous in that they exhibit relatively good scratch, water, and heat resistance properties. However, the use of plastic laminated surfaces is readily apparent from an inspection of the furniture, and thereby undesirably limits the value of the furniture.

A more suitable approach in the prior art for simulating hand-rubbed wood finishes has been to coat the surface of a furniture panel with a radiation-sensitive coating such as an ultraviolet curable, polyester resin. See, for example, U.S. Pat. Nos. 3,511,687 and 3,669,716. After coating, the panel is subjected to a source of radiation such as ultraviolet producing mercury vapor lamps to cure the coating without hand rubbing to a hard, durable and scratch-resistant finish. However, the cured panel surface typically has an appearance which does not show the minute scratches obtained using a hand-rubbed finishing step. Further, radiation sensitive coatings of the prior art have not been usable for achieving a surface phenomena known as "flop", wherein the surface gloss of a furniture panel varies according to the angle of viewing. This phenomena does occur by hand-rubbing the furniture panel, and is therefore a highly desirable surface characteristic. However, because of their high durability and scratch resistance, radiation curable coatings cannot be hand-rubbed satisfactorily.

It is therefore an object of this invention to provide a process for imparting an accurately simulated hand-rubbed surface finish to a natural or simulated wood panel. Further, it is an object of this invention to provide a process for selectively obtaining different final surface glosses using a radiation sensitive surface coating having optimum scratch, water, and heat resistance properties.

SUMMARY OF THE INVENTION

In accordance with the process of this invention, the surface of a panel of furniture or the like formed from wood, particle board, plastic, etc., is coated with a liquid radiation curable resinous material. A radiation permeable film is rolled onto the panel in intimate contact with the liquid curable coating. The film has a controlled gloss surface on the side thereof in contact with the curable coating. The controlled gloss surface has a predetermined surface gloss accurately matching the desired surface and gloss characteristics, such as that of a hand-rubbed wood finish, and thereby causes the curable coating to conform to the desired surface configuration matching the controlled gloss surface. Importantly, the surface and gloss characteristics to be imparted to the curable coating can be altered by altering the controlled gloss surface on the film.

The coated panel and overlying film are passed into a radiation oven, and are therein irradiated by a radiation source such as ultraviolet producing mercury vapor lamps. The radiation penetrates the film to cure the resinous coating on the panel. Accordingly, the coating is cured to a hard and durable surface finish accurately conforming to the characteristics of the controlled gloss surface on the film. After curing, the film and controlled gloss surface thereon are peeled from the panel to leave exposed the cured panel surface finish.

BRIEF DESCRIPTION OF THE DRAWINGS

The following drawings illustrate the invention. In such drawings.

DETAILED DESCRIPTION OF THE PREFERRED EMBODIMENT

Figure 2:
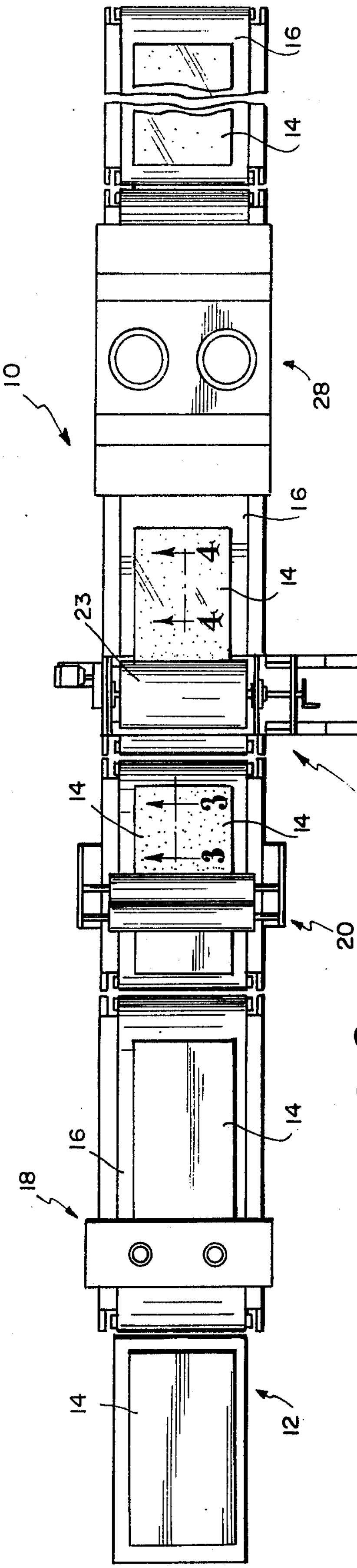
FIG. 2 is a top plan view of the production line shown in FIG. 1.
Figure 1:
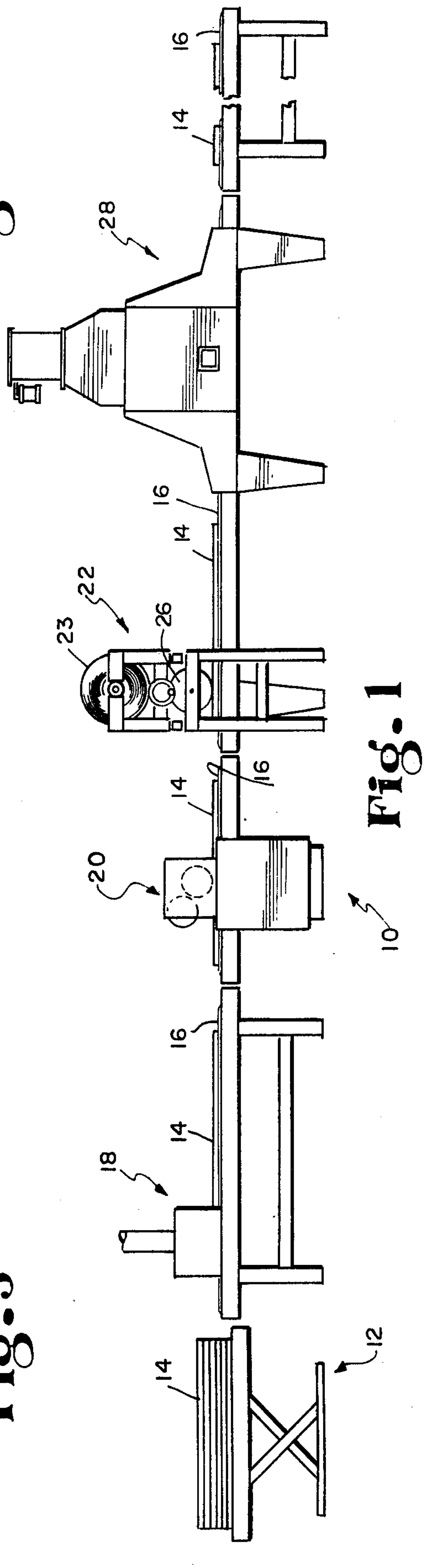
FIG. 1 is a side elevation view of a furniture finishing production line showing apparatus for use in the coating process of this invention.

The coating process of this invention is illustrated by the production line 10 shown in FIGS. 1 and 2. As shown, the line comprises a loading station 12 for loading panels 14 one at a time onto a horizontally moving series of end-to-end conveyors 16. Each panel 14 comprises a panel for use in furniture construction or the like, and is formed from wood, particle board, plastic, vinyl, paper laminated to a panel substrate, etc. The panels each have an upwardly presented surface which has been suitably prepared for finishing as by sanding, buffing, filling, etc. With some panels, the surface is typically prepared by printing thereon a simulated wood grain design or other pattern.

Figure 3:
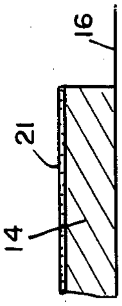
FIG. 3 is an enlarged fragmental vertical section taken on the line 3—3 of FIG. 2.

The panels 14 are individually conveyed through a panel cleaning station 18 for brushing and vacuum removal of dust and the like from the upwardly presented panel surface. Then, the panels travel along the conveyor 16 through a roll coater 20 which applies a liquid radiation-sensitive coating 21 to the upper surface of the panel, as shown in FIG. 3. In practice, this coating is an ultraviolet curable polymerizable polyester resin such as that known as a U. V. curable topcoat sold by Reliance Universal, Inc. and identified by their stock number 5-239-87. This coating is applied to the panel in an appropriate thickness so that the final cured coating typically has a thickness of from about 0.005 inches to about 0.0055 inches. alternately, the same coating can be applied to the panels by liquid spray or curtain coating apparatus, all in a well-known manner. Further, the coating 21 can comprise any material which is sensitive to a given type of radiation, such as an acrylic material curable upon incidence of electron beam radiation.

The coated panels 14 are individually conveyed from the roll coater 20 through a roll dispenser 22 having a roll of casting film 23 rotatably carried thereon. In practice, with ultraviolet radiation sensitive coatings, this casting film 23 comprises a relatively strong and stretch-free transparent plastic film 24, such as that sold under the trademark Mylar and having a thickness of from about 0.3 mils of about 1.0 mils. Alternately, the film 24 can comprise aluminum foil or the like for use with electron beam radiation sensitive coatings.

The film 24 has a controlled gloss surface 25 on one side thereof. This surface 25 comprises a thin radiation permeable layer having a controlled surface roughness, or gloss, corresponding to the surface finish desired on the panels 14. For example, the controlled gloss surface can be formed to have a surface gloss of about 60 as measured with a 60° glossometer to correspond with the surface gloss of hand-rubbed lacquer finishes. Similarly, the controlled gloss surface can be formed to include any desired surface configuration such as minute scratches, wood grain imprints, etc., and to include the phenomena known as "flop".

Figure 4:
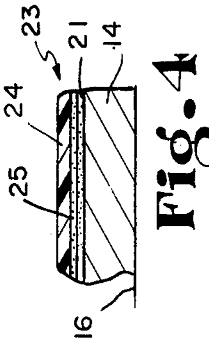
FIG. 4 is an enlarged fragmented vertical section taken on the line 4—4 of FIG. 2.

The casting film 23 comprising the Mylar film 24 and the controlled gloss surface 25 is rolled onto the panels 14 as they pass through the dispenser 22 by a transversely extending roller 26. Importantly, as shown in FIG. 4, the casting film 23 has controlled gloss surface 25 presented downwardly so that controlled gloss surface 25 is placed in intimate sealing contact with the coated panels 14 by the roller 26. This removes any bubbles or air pockets between the casting film 23 and the coated panels 14, and causes the liquid curable coating 21 on the panels 14 to accurately conform to the surface configuration, or gloss, of the controlled gloss surface 25 on the Mylar film 24.

The coated panels 14 travel from the roll dispenser 22 together with the overlying casting film 23 into a radiation oven 28. With an ultraviolet sensitive coating 21 on the panels 14, this oven 28 has one or more ultraviolet radiation sources such as mercury vapor lamps (not shown) to provide ultraviolet radiation for permeating the transparent Mylar film 24 and the controlled gloss surface 25. Alternately, with an electron beam radiation sensitive coating 21, the oven has a series of radiation sources for providing electron beam radiation. The radiation causes the curable coating 21 on the panels 14 to cure in the oven to a hard and durable finish having a surface configuration matching the surface configuration of the controlled gloss surface 25. When the panels 14 exit the oven 28, the casting film 23 is peeled from the panels 14 to expose a finished panel surface having the advantageous characteristics of durable radiation curable coatings together with a predetermined surface configuration such as a surface gloss corresponding to that of hand-rubbed wood.

The process of this invention is particularly useful in finishing panels for use in furniture construction to accurately simulate a variety of surface characteristics. However, it should be understood that the scope of the invention is not limited to furniture finishing processes. Instead, the process of this invention is applicable whenever a hard and durable radiation curable surface coating is desired having a predetermined surface configuration. The permeable film 24 of the casting film 23 can comprise any suitable radiation permeable material such as quartz or glass plate, or plastic materials such as clear thin polyethylene, polyester, or acrylic. The controlled gloss surface 25 on the radiation permeable film 24 can be applied to the film in a number of ways, such as by embossing, printing, or coating, or by directly forming the controlled gloss surface on the film as by etching. Moreover, the radiation curable coating 21 can be applied to the panels 14 by placing the coating 21 on the casting film 23 in contact with the controlled gloss surface 25, and then bringing the curable coating 21 into contact with the panels by means of the roller 26. And, if desired, the process is usable wherein a solvent based vinyl resin tie coat material such as Tye Coat #367-C5-1836, sold by Reliance Universal, Inc., is applied as a thin (less than 0.0005 inch) film to the panel surfaces prior to coating thereof with the radiation curable coating 21 to insure maximum adhesiveness of the curable coating to the panel.

In a specific example of the process of this invention, 45 pound density particle board was prepared for finishing by sanding, filling, buffing, etc. The particle board surface was imprinted with a suitable wood grain design, and then sealed by an appropriate sealer. The particle board was then passed through the cleaning station 18 for final cleaning, and then through the roll coater 20 for application to the surface thereof of an ultraviolet curable coating 2 identified as Topcoat #5-239-87 and sold by Reliance Universal, Inc. The coated panel was then directed through the roll dispenser 22 for application of the casting film 23 over the upwardly presented panel surface. Said film was stock #1689P2 produced by the Thermark Division of Avery, Inc., and had a 1.0 mil thickness with a 60 gloss controlled surface 25 having a thickness of about 0.0002 inch and formed from a thin layer of a dried resinous coating material. The controlled gloss surface 25 was placed in intimate sealing contact with the coated surface 21 of the panel 14. Then, the film 24, the controlled gloss surface 25, and the coated panel 14 were together conveyed through the radiation oven 28 for subjecting the curable coating 21 to ultraviolet radiation for approximately 10 seconds. The panel 14 then exited the oven whereupon the film 24 and the controlled gloss surface 25 were peeled from the panel to expose a cured panel coating having a 60 gloss surface finish.

What is claimed is:

1. A process of applying a predetermined surface finish to a panel comprising the steps of coating the surface of the panel with a radiation curable liquid coating material; covering the liquid coated panel surface with a radiation permeable casting film having a predetermined surface finish on its side in contact with the coated panel, rolling the film on the panel to cause the uncured coating material intimately to conform to said predetermined casting film surface finish; and then irradiating the coated panel through said casting film to cause the coating material to cure in conformance with the predetermined surface finish on said casting film.

2. The process of claim 1 with the additional step of cleaning the surface of the panel before said coating step.

3. The process of claim 1 with the additional step of removing the casting film from the coated panel after said irradiating step.

4. The process of claim 1 wherein said covering step comprises covering the coated panel surface with a transparent material having a controlled gloss surface with a predetermined surface finish on the side thereof in contact with the coated panel.

5. The process of claim 4 wherein said transparent material comprises a transparent plastic film.

6. The process of claim 4 wherein said gloss controlled surface comprises a layer of a dried resinous coating material on one side of said transparent material.

7. The process of claim 1 wherein said coating step comprises passing the panel through a roll coater for application of the radiation curable coating material to the surface thereof.

8. The process of claim 1 wherein said radiation curable coating comprises an ultraviolet curable, polymerizable resin in liquid form, and said irradiating step comprises subjecting the coated panel to an ultraviolet radiation source through said casting film.

9. The process of claim 1 wherein said radiation curable coating comprises an electron beam curable coating material in liquid form, and said irradiating step comprises subjecting the coated panel and casting film to an electron beam radiation source.

10. The process of claim 1 with the additional step of coating the panel surface with a tie coat material prior to coating said surface with the radiation curable coating.

* * * * *